United States Patent
Yi (10) Patent No.: US 10,594,776 B2
(45) Date of Patent: Mar. 17, 2020

(54) INFORMATION PUBLISHING METHOD, DEVICE AND SERVER

(71) Applicant: GUANGZHOU UCWEB COMPUTER TECHNOLOGY CO., LTD., Guangzhou (CN)

(72) Inventor: Lingyun Yi, Guangzhou (CN)

(73) Assignee: Guangzhou UCWeb Computer Technology Co., Ltd., Guangzhou (CN)

( * ) Notice: Subject to any disclaimer, the term of this patent is extended or adjusted under 35 U.S.C. 154(b) by 106 days.

(21) Appl. No.: 15/855,878

(22) Filed: Dec. 27, 2017

(65) Prior Publication Data
US 2018/0191809 A1    Jul. 5, 2018

(30) Foreign Application Priority Data

Dec. 29, 2016 (CN) .......................... 2016 1 1249387

(51) Int. Cl.
| | |
|---|---|
| *G06F 15/16* | (2006.01) |
| *G06F 17/30* | (2006.01) |
| *H04L 29/08* | (2006.01) |
| *G06F 16/951* | (2019.01) |
| *G06F 16/958* | (2019.01) |
| *H04L 12/24* | (2006.01) |
| *H04L 29/06* | (2006.01) |

(52) U.S. Cl.
CPC ............ *H04L 67/10* (2013.01); *G06F 16/951* (2019.01); *G06F 16/958* (2019.01); *H04L 67/02* (2013.01); *H04L 67/06* (2013.01); *H04L 67/26* (2013.01)

(58) Field of Classification Search
USPC ................ 709/219, 230, 203, 217, 227, 206
See application file for complete search history.

(56) References Cited

U.S. PATENT DOCUMENTS

| | | | |
|---|---|---|---|
| 5,247,575 A | 9/1993 | Sprague et al. | |
| 5,740,369 A | 4/1998 | Yokozawa et al. | |
| 5,907,836 A | 5/1999 | Sumita et al. | |
| 6,044,372 A | 3/2000 | Rothfus et al. | |
| 6,226,589 B1 | 5/2001 | Maeda et al. | |
| 6,240,451 B1 | 5/2001 | Campbell et al. | |
| 6,405,249 B1 | 6/2002 | Matsuda et al. | |
| 6,441,291 B2 | 8/2002 | Hasegawa et al. | |

(Continued)

FOREIGN PATENT DOCUMENTS

EP     1985024 B1    9/2015

*Primary Examiner* — Jude Jean Gilles
(74) *Attorney, Agent, or Firm* — Sheppard Mullin Richter & Hampton LLP (57) ABSTRACT

The present invention provide an information publishing method and device and a server, wherein the method comprises: the server receiving published information from the information publishing terminal and acquiring, according to the information publishing terminal, an online status of a corresponding information receiving terminal; and the server sending the published information to the information receiving terminal according to the online status of the information receiving terminal. Relative to the prior art, published information can be sent according to an online status of an information receiving terminal, such that the information receiving terminal can promptly receive the published information from the information publishing terminal.

20 Claims, 4 Drawing Sheets

(56) References Cited

U.S. PATENT DOCUMENTS

| | | |
|---|---|---|
| 6,819,301 B2 | 11/2004 | Nagamatsu et al. |
| 6,990,489 B2 | 1/2006 | Kondo et al. |
| 7,209,893 B2 | 4/2007 | Nii |
| 7,317,697 B2 | 1/2008 | Lewis et al. |
| 8,032,647 B2* | 10/2011 | Shon .................. H04L 29/12292 |
| | | 709/230 |
| 8,477,868 B2 | 7/2013 | Han et al. |
| 8,768,766 B2 | 7/2014 | Ellis et al. |
| 2005/0086376 A1* | 4/2005 | Park ........................ H04L 67/24 |
| | | 709/245 |
| 2005/0265296 A1* | 12/2005 | Zhang .................. H04W 4/029 |
| | | 370/338 |
| 2006/0277375 A1* | 12/2006 | Takeuchi ............... G06Q 10/10 |
| | | 711/154 |
| 2008/0008158 A1* | 1/2008 | Lee ........................ H04L 51/04 |
| | | 370/352 |
| 2008/0027996 A1* | 1/2008 | Morris .................. G06F 16/252 |
| 2008/0039707 A1* | 2/2008 | Sugiyama ............. G06F 19/321 |
| | | 600/407 |
| 2008/0267371 A1* | 10/2008 | Shibata .................. H04L 63/08 |
| | | 379/93.17 |
| 2010/0088371 A1* | 4/2010 | Xu .......................... H04W 8/22 |
| | | 709/203 |
| 2010/0235323 A1* | 9/2010 | Zhang .................. G06F 19/321 |
| | | 707/623 |
| 2011/0231544 A1* | 9/2011 | Javenpaa ................ H04L 67/24 |
| | | 709/224 |
| 2014/0359466 A1* | 12/2014 | Wan ....................... H04L 51/043 |
| | | 715/739 |
| 2015/0356634 A1* | 12/2015 | Kallman ................ G06Q 10/10 |
| | | 705/51 |
| 2016/0028799 A1* | 1/2016 | Kallman ................ G06Q 10/107 |
| | | 709/206 |
| 2016/0065682 A1* | 3/2016 | Li ........................... H04L 67/26 |
| | | 709/204 |
| 2016/0182440 A1* | 6/2016 | Wang .................... H04L 41/085 |
| | | 709/204 |
| 2016/0212091 A1* | 7/2016 | Volach ................... H04L 51/36 |
| 2016/0241631 A1* | 8/2016 | Tamura .................. H04L 67/06 |
| 2017/0171120 A1* | 6/2017 | Chiang ................ H04L 51/043 |

* cited by examiner

INFORMATION PUBLISHING METHOD, DEVICE AND SERVER

CROSS REFERENCE TO RELATED APPLICATION

This application claims the priority of Chinese Patent Application No. 201611249387.X filed with the State Intellectual Property Office of the People's Republic of China on Dec. 29, 2016, the content of which is incorporated herein by reference in its entirety.

TECHNICAL FIELD

The present application relates to the field of information propagation technologies, and in particular, to an information publishing method and device and a server.

BACKGROUND

Along with the development of information technologies, writing network information (e.g. Weibo, online articles, etc.) has become very popular. An information publishing person (e.g. a writer or a person of self media) publishes online information via a network, and a subscriber (e.g. a reader) can proactively acquire the information published by the information publishing person by means of following or subscription. After the information publishing person publishes the information, however, the published information will not be immediately sent to the subscriber. As a result, the subscriber is unable to promptly acquire the published information from the information publishing person.

SUMMARY

In light of this, an object of the present disclosure is to provide an information publishing method that enables a subscriber to promptly acquire published information. The method is applied to an information publishing terminal and a server in communication connection with an information receiving terminal, the server comprising a database storing a correspondence between an information publishing terminal and an information receiving terminal. The method comprises:

the server receiving published information from the information publishing terminal and acquiring, according to the information publishing terminal, an online status of a corresponding information receiving terminal;

the server sending the published information to the information receiving terminal according to the online status of the information receiving terminal.

Another embodiment of the present disclosure further provides an information publishing device applied to an information publishing terminal and a server in communication connection with an information receiving terminal, wherein the server comprises a database storing a correspondence between an information publishing terminal and an information receiving terminal, and the device comprises:

a receiving and acquiring module configured to receive published information from the information publishing terminal and acquire, according to the information publishing terminal, an online status of a corresponding information receiving terminal;

an information sending module configured to send the published information to the information receiving terminal according to the online status of the information receiving terminal.

Other embodiments of the present disclosure further provide a server, comprising: a memory, a processor, and an information publishing device. The information publishing device is installed or stored in the memory for the processor to control execution of functional modules of a content screening device.

With the information publishing method and device according to embodiments of the present invention, first, according to an information publishing terminal that publishes information, an information receiving terminal corresponding to the information publishing terminal is acquired; subsequently, an online status of the above information receiving terminal is acquired; lastly, the published information is sent to the information receiving terminal according to the online status of the information receiving terminal. The embodiments of the present invention can send published information according to an online status of an information receiving terminal, such that the information receiving terminal can promptly receive published information from an information publishing terminal.

BRIEF DESCRIPTION OF THE DRAWINGS

To more clearly describe technical solutions in the embodiments of the present disclosure, the accompanying drawings to be used in the description of the embodiments will be described briefly as follows. It should be understood that the accompanying drawings in the following description merely illustrate some embodiments of the present disclosure, and therefore, they should not be interpreted as limitations to the scope. To a person skilled in the art, other relevant drawings may be further obtained according to these drawings without inventive effort.

LEGENDS

10—server; 11—first memory; 12—first processor; 13—communication unit; 110—information publishing device; 1101—receiving and acquiring module; 1102—information sending module; 1103—relationship establishing module; 111—database; 20—user terminal; 21—information publishing terminal; 22—information receiving terminal; 24—second memory; 25—storage controller; 26—second processor.

DETAILED DESCRIPTION OF THE DISCLOSURE

The technical solutions in embodiments of the present disclosure will be clearly and completely described below with reference to the accompanying drawings in the embodiments of the present disclosure. Apparently, the described embodiments are merely some, rather than all, of the embodiments of the present disclosure. Components of the embodiments of the present disclosure described and illustrated in the accompanying drawings can usually be arranged and designed in various configurations. Therefore, the detailed description of the embodiments of the present disclosure provided in the accompanying drawings below are not intended to limit the scope of the present disclosure; rather, they only represent selected embodiments of the present disclosure. All other embodiments obtained by a person skilled in the art without inventive effort and on the basis of the embodiments of the present disclosure shall be encompassed by the present disclosure.

It should be noted that similar numbers and letters in the following drawings represent similar items. Therefore, once an item is defined in one figure, there is no need to further define or explain the item in subsequent figures. In the description of the present invention, meanwhile, the terms like "first" and "second" are only used for the purpose of differentiation in the description, and should not be construed as indication or implication of relative importance.

Figure 1:
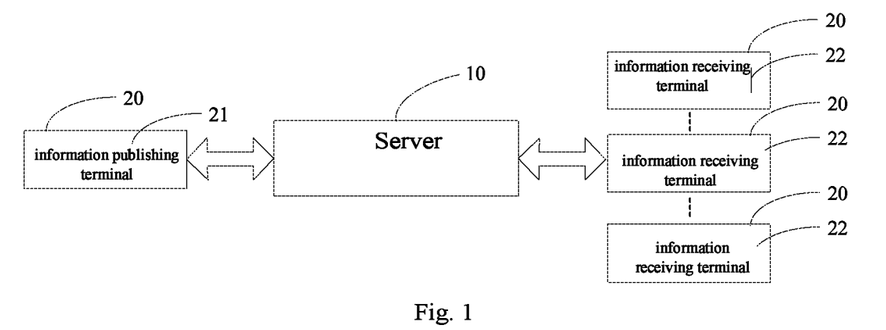
FIG. 1 is a schematic diagram of communication interaction between a server and at least one user terminal according to an embodiment of the present disclosure.

FIG. 1 is a schematic diagram of communication interaction between a server 10 and at least one user terminal 20 according to a preferred embodiment of the present disclosure. An information publishing terminal 21 for publishing information or an information receiving terminal 22 for receiving information may run on the user terminal 20. The information publishing terminal 21 sends information to the information receiving terminal 22 via the server 10. In the present embodiment, the server 10 may be, but is not limited to, a web server. The user terminal 20 may be, but is not limited to, a smart phone, a personal computer (PC), a tablet computer, a personal digital assistant (PDA), a mobile Internet device (MID), etc. The network may be, but is not limited to, a wired network or a wireless network. The information publishing terminal 21 or the information receiving terminal 22 may be an Application (APP) that runs on the user terminal 20, such as WeChat, a public account, Weibo, etc.

Figure 2:
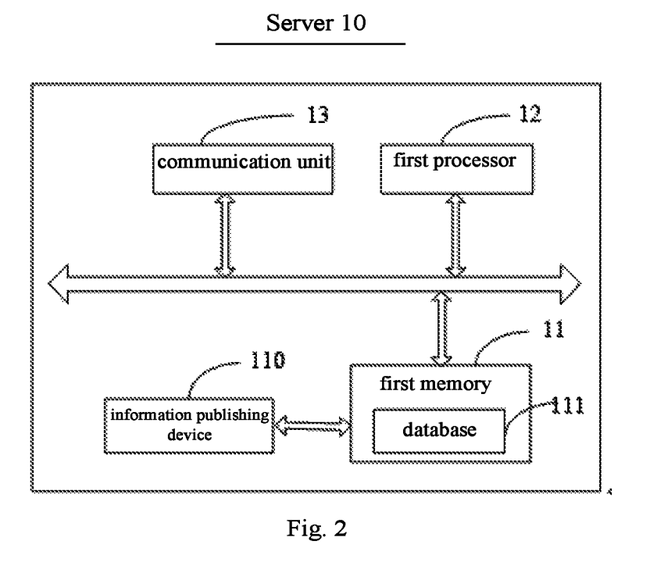
FIG. 2 is a schematic block diagram of the server as shown in FIG. 1 according to an embodiment of the present disclosure.

FIG. 2 is a schematic block diagram of the server 10 shown in FIG. 1. The server 10 comprises an information publishing device 110, a first memory 11, a first processor 12, and a communication unit 13.

The components, including the first memory 11, the first processor 12, and the communication unit 13, are electrically connected, directly or indirectly, with each other to achieve data transmission or exchange. For example, electrical connection between these components may be achieved via one or more communication buses or signal cables.

Here, the first memory 11 may be, but is not limited to, a Random Access Memory (RAM), a Read Only Memory (ROM), a Programmable Read-Only Memory (PROM), an Erasable Programmable Read-Only Memory (EPROM), and an Electric Erasable Programmable Read-Only Memory (EEPROM). Here, the first memory 11 is configured to store a program, and upon receiving an execution command, the first processor 12 executes the program. The first memory 11 further comprises a database 111, and the database 111 is configured to store a correspondence between the information publishing terminal 21 and the information receiving terminal 22. The communication unit 13 is configured to establish a communication connection between the server 10 and the user terminal 20 via the network and to receive and send data via the network.

The information publishing device 110 comprises at least one software functional module that can be stored in the first memory 11 or solidified in an operating system (OS) of the server 10 in the form of software or firmware. The first processor 12 is configured to execute executable modules stored in the first memory 11, such as the software functional module and computer programs comprised in the information publishing device 110.

Figure 3:
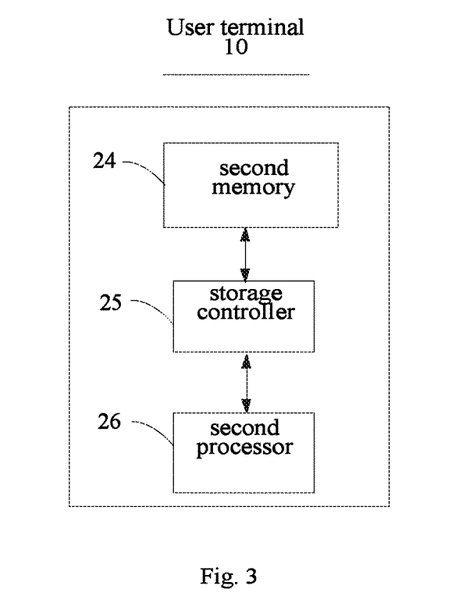
FIG. 3 is a schematic block diagram of the user terminal as shown in FIG. 1 according to an embodiment of the present disclosure.

Referring to FIG. 3, the user terminal 20 may comprise a second memory 24, a storage controller 25, and a second processor 26.

The components, including the second memory 24, the storage controller 25, and the second processor 26, are electrically connected, directly or indirectly, with each other to achieve data transmission or exchange. For example, electrical connection between these components may be achieved via one or more communication buses or signal cables.

Here, the second memory 24 is similar to the first memory 11 described above, and the second processor 26 is similar to the first processor 12 described above, which will not be repeated herein.

Figure 4:
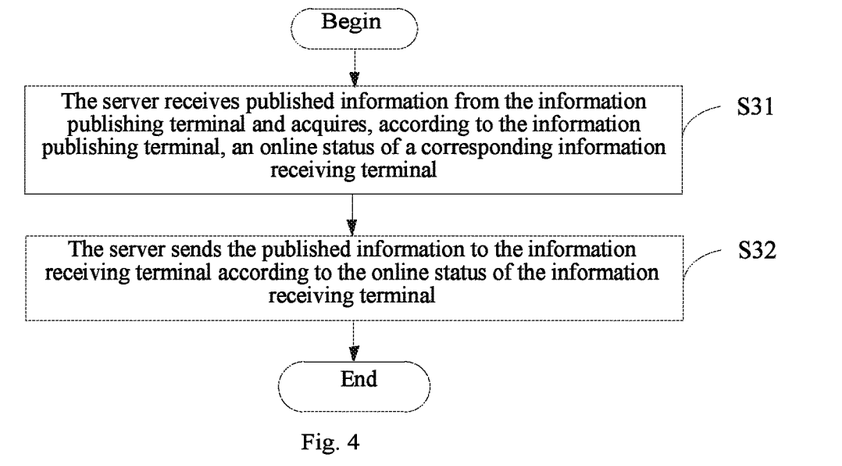
FIG. 4 is a schematic flow chart of an information publishing method according to an embodiment of the present disclosure.

Referring to FIG. 4, FIG. 4 is a flow chart of an information publishing method applied to the server 10 in FIG. 2 according to an embodiment of the present disclosure. The server 10 is in communication connection with the user terminal 20 that runs the information publishing terminal 21 and the information receiving terminal 22, wherein the server 10 comprises a database 111 storing a correspondence between the information publishing terminal 21 and the information receiving terminal 22. The specific flow of the information publishing method will be described in detail below.

Step S31, the server 10 receives published information from the information publishing terminal 21 and acquires, according to the information publishing terminal 21, an online status of a corresponding information receiving terminal 22.

In response to a publishing operation to publish information, the information publishing terminal 21 sends the information to be published to the server 10. Upon receiving the published information, the server 10 acquires an online status of the information receiving terminal 22 corresponding to the information publishing terminal 21. In the present embodiment, the published information may comprise identification information of the information publishing terminal 21, wherein the identification information includes, but is not limited to, registration name, registration ID, etc. of an information publishing person. The server 10 can search the database 111 by using the identification information of the information publishing terminal 21 to obtain the information receiving terminal 22 having a correspondence. The information publishing terminal 21 can have a correspondence with at least one information receiving terminal 22. The online status refers to whether the information receiving terminal 22 is opened at the front end of the user terminal 20. When it is opened, it is determined that the online status of the information receiving terminal 22 is online; when it is not opened or runs at the back end, it is determined that the online status of the information receiving terminal 22 is offline.

The manner in which the server 10 acquires an online status of the information receiving terminal 22 will be described below.

Figure 5:
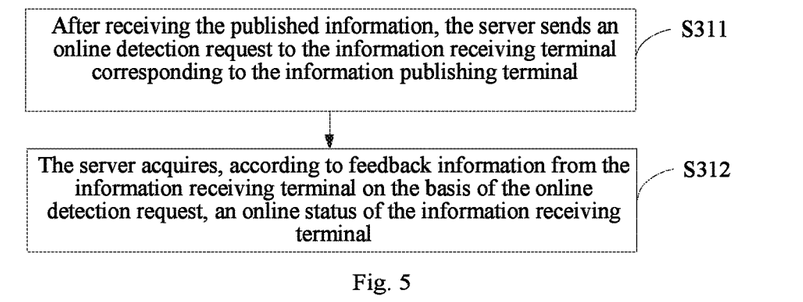
FIG. 5 is a schematic diagram of sub-steps comprised in the step S31 in FIG. 4.

Referring to FIG. 5, in an implementation manner of the present embodiment, the step S31 comprises the following sub-steps.

Sub-step S311, after receiving the published information, the server 10 sends an online detection request to the information receiving terminal 22 corresponding to the information publishing terminal 21.

Specifically, after receiving the published information, the server 10 will automatically generate an online detection request. The server 10 searches the database 111 and finds the information receiving terminal 22 having a correspondence with the information publishing terminal 21, and sends the online detection request to the information receiving terminal 22 having a correspondence with the information publishing terminal 21.

Sub-step S312, the server 20 acquires, according to feedback information from the information receiving terminal 22 on the basis of the online detection request, an online status of the information receiving terminal 22.

In the present embodiment, after receiving the online detection request, the information receiving terminal 22 will send the feedback information to the server 10. For example, when the information receiving terminal 22 is online, the feedback information would comprise running conditions of the information receiving terminal 22 (e.g. the situation of data flow use). When the information receiving terminal 22 is offline, the feedback information would not comprise running conditions of the information receiving terminal 22. By detecting the running conditions in the feedback information, the server 10 can obtain the online status of the information receiving terminal 22.

Figure 6:
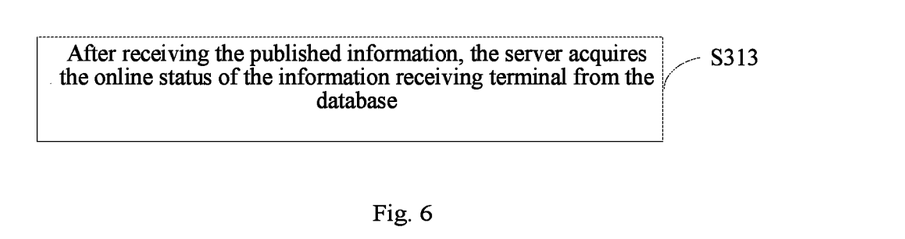
FIG. 6 is another schematic diagram of sub-steps comprised in the step S31 in FIG. 4.

Referring to FIG. 6, in another implementation manner of the present embodiment, the step S31 comprises the following sub-steps.

Sub-step S313, after receiving the published information, the server 10 acquires the online status of the information receiving terminal 22 from the database 111.

For example, in the present implementation manner, the server 10 can acquire the online status of the information receiving terminal 22 in real time and update the same in the database 111. After receiving the published information, the server 10 can acquire the online status of the information receiving terminal 22 from the database 111.

In an implementation manner of the present embodiment, the sub-step S313 may be implemented in the following manner. First, the server 10 sends an online detection request to the information receiving terminal 22 at a preset time interval. Subsequently, the server 10 acquires, according to feedback information of the online detection request, an online status of the information receiving terminal 22 and stores the online status of the information receiving terminal 22 in the database 111.

In the present implementation manner, the preset time interval may be set according to actual needs. For example, an APP has a relatively fast frequency at which published information is updated, and the time interval of online detection on the information receiving terminal 22 corresponding to the APP can be set to be very small (e.g. 1 s). When another APP has a relatively slow frequency at which published information is updated, the time interval of online detection on the information receiving terminal 22 corresponding to the APP can be set to be relatively high (e.g. 20 s).

Step S32, the server 10 sends the published information to the information receiving terminal 22 according to the online status of the information receiving terminal 22.

Figure 7:
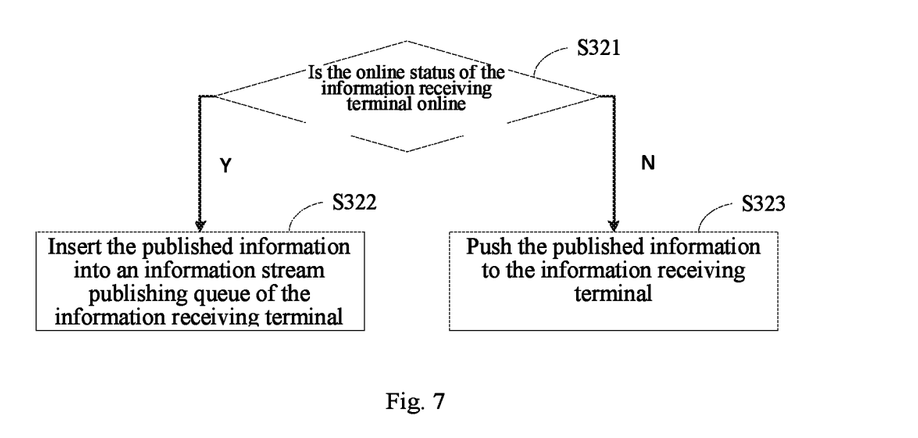
FIG. 7 is a schematic diagram of sub-steps comprised in the step S32 in FIG. 4.

Referring to FIG. 7, in the present embodiment, the step S32 may comprise the following sub-steps.

Sub-step S321, determine whether the online status of the information receiving terminal 22 is online. When the online status of the information receiving terminal 22 is online, go to Sub-step S322; when the online status of the information receiving terminal 22 is offline, go to Sub-step S323.

Sub-step S322, insert the published information into an information stream publishing queue of the information receiving terminal 22.

By inserting the published information into an information stream publishing queue of the information receiving terminal 22, the information receiving terminal 22 under the online status can promptly receive the published information.

Sub-step S323, push the published information to the information receiving terminal 22.

By pushing the published information to the information receiving terminal 22, the offline information receiving terminal 22 can, when opened at the front end, promptly receive the pushed published information.

Figure 8:
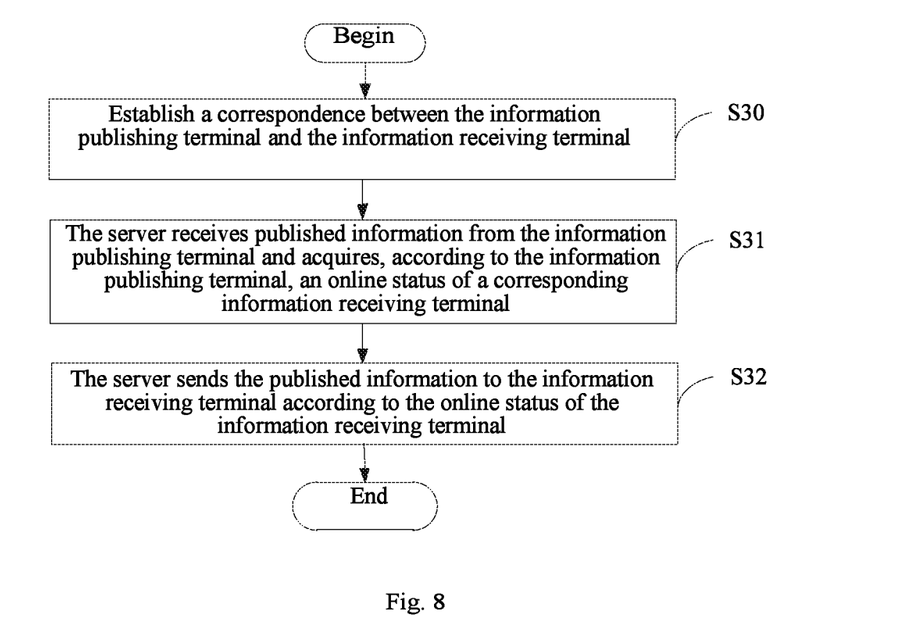
FIG. 8 is a schematic flow chart of another information publishing method according to an embodiment of the present disclosure.

Referring to FIG. 8, in the present embodiment, the information publishing method may further comprise a step S30.

Step S30, establish a correspondence between the information publishing terminal 21 and the information receiving terminal 22.

In the present embodiment, the server 10 establishes, according to an operation received by the information receiving terminal 22 for establishing a correspondence with the information publishing terminal 21, a correspondence between the information receiving terminal 22 and the information publishing terminal 21, and stores the correspondence, wherein the operation includes a following operation or a subscription operation.

Figure 9:
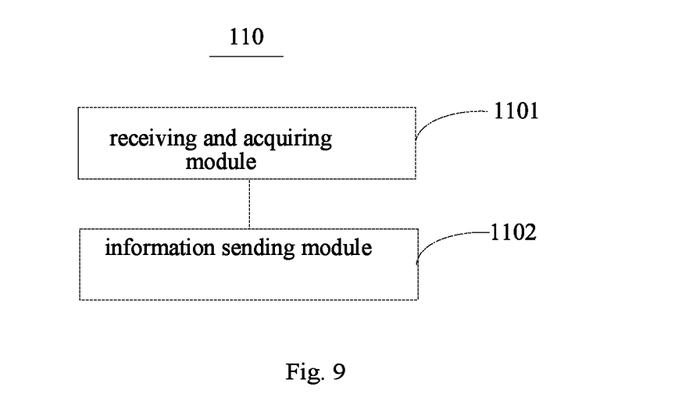
FIG. 9 is a schematic block diagram of an information publishing device according to an embodiment of the present disclosure.

Referring to FIG. 9, and FIG. 9 is a block diagram applied to the information publishing device 110 as shown in FIG. 2 according to an embodiment of the present disclosure. The information publishing device 110 is applied to the server 10, and the information publishing device 110 comprises a receiving and acquiring module 1101 and an information sending module 1102.

The receiving and acquiring module 1101 is configured to receive published information from the information publishing terminal 21 and acquire, according to the information publishing terminal 21, an online status of an information receiving terminal 22

In the present embodiment, the manner in which the receiving and acquiring module 1101 receives published information from the information publishing terminal 21 and acquires, according to the information publishing terminal 21, an online status of an information receiving terminal 22 comprises:

after receiving the published information, sending an online detection request to the information receiving terminal 22 corresponding to the information publishing terminal 21; and the receiving and acquiring module 1101 acquiring, according to feedback information of the online detection request, an online status of the information receiving terminal 22.

The manner in which the receiving and acquiring module 1101 receives published information from the information publishing terminal 21 and acquires, according to the information publishing terminal 21, an online status of an information receiving terminal 22 comprises:

after receiving the published information, acquiring the online status of the information receiving terminal 22 from the database 111.

The manner in which, after receiving the published information, the receiving and acquiring module 1101 acquires the online status of the information receiving terminal 22 from the database 111 comprises:

sending an online detection request to the information receiving terminal 22 at a preset time interval; and the receiving and acquiring module 1101 acquiring, according to feedback information of the online detection request, an online status of the information receiving terminal 22 and stores the online status of the information receiving terminal 22 in the database 111.

In the present embodiment, the receiving and acquiring module 1101 is configured to execute the step S31 in FIG. 4. Refer to the description of the step S31 in the first embodiment for specific description of the receiving and acquiring module 1101.

The information sending module 1102 is configured to send the published information to the information receiving terminal 22 according to the online status of the information receiving terminal 22. In the present embodiment, the manner in which the information sending module 1102 sends the published information to the information receiving terminal 22 according to the online status of the information receiving terminal 22 comprises:

when the online status of the information receiving terminal 22 is online, inserting the published information into an information stream publishing queue of the information receiving terminal 22, such that the information receiving terminal 22 promptly receives the published information from the information stream publishing queue; and when the online status of the information receiving terminal 22 is offline, pushing the published information to the information receiving terminal 22.

In the present embodiment, the information sending module 1102 is configured to execute the step S32 in FIG. 4. Refer to the description of the step S32 in the first embodiment for specific description of the information sending module 1102.

Figure 10:
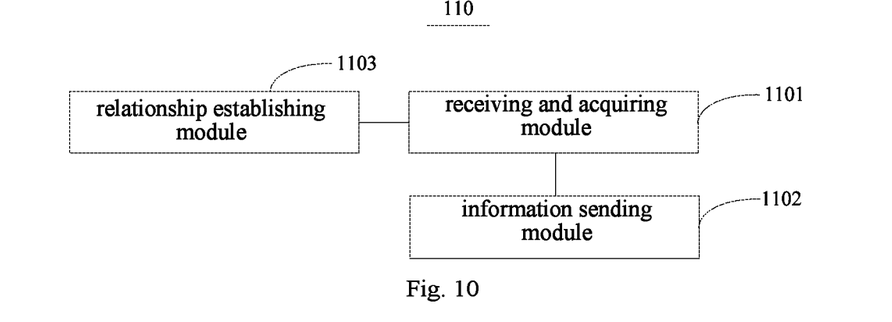
FIG. 10 is a schematic block diagram of another information publishing device according to an embodiment of the present disclosure.

Referring to FIG. 10, in the present embodiment, the information publishing device 110 further comprises a relationship establishing module 1103.

The relationship establishing module 1103 is configured to establish a correspondence between the information publishing terminal 21 and the information receiving terminal 22.

The manner in which the relationship establishing module 1103 establishes a correspondence between the information publishing terminal 21 and the information receiving terminal 22 comprises:

establishing, according to an operation received by the information receiving terminal 22 for establishing a correspondence with the information publishing terminal 21, a correspondence between the information receiving terminal 22 and the corresponding information publishing terminal 21, and storing the correspondence, wherein the operation includes a following operation or a subscription operation.

In the present embodiment, the relationship establishing module 1103 is configured to execute the step S30 in FIG. 8. Refer to the description of the step S30 in the first embodiment for specific description of the relationship establishing module 1103.

In summary, the embodiments of the present disclosure provide the information publishing method and device and a server. First, according to an information publishing terminal that publishes information, an information receiving terminal corresponding to the information publishing terminal is acquired; subsequently, an online status of the above information receiving terminal is acquired; lastly, the published information is sent to the information receiving terminal according to the online status of the information receiving terminal. Compared with the prior art, a strategy to send published information can be selected according to an online status of an information receiving terminal, such that the information receiving terminal can promptly receive information published from an information publishing terminal.

From the several embodiments provided by the embodiments of the present disclosure, it should be understood that the disclosed system and method may also be implemented in other manners. The system and method embodiments described above are merely exemplary. For example, the flowcharts and block diagrams in the accompanying drawings illustrate architectures, functions and operations that may be implemented for the system, method and computer program products of a plurality of embodiments of the present disclosure. With regard to this point, each block in the flowcharts or block diagrams may represent a part of a device, program segment or code. The part of a device, program segment or code comprises one or more executable instructions for implementing prescribed logic functions. It should also be noted that, in some alternative implementation manners, functions marked in the blocks may also take place in an order different from the one marked in the accompanying drawings. For example, two consecutive blocks may actually be executed in a substantially parallel manner, and sometimes, they may also be executed in a reverse order, which is dependent on the involved functions. It should also be noted that each block in the flowcharts and/or block diagrams and a combination of blocks in the flowcharts and/or block diagrams can be implemented by a hardware-based dedicated system for executing prescribed functions or actions or implemented by a combination of dedicated hardware and computer instructions.

Furthermore, functional devices in the embodiments of the present disclosure may be integrated into one independent part, or each device may exist independently, or two or more devices may be integrated into independent part.

If the functions are implemented in a form of a software functional device and sold or used as an independent product, they may be stored in a computer readable storage medium. Based on such an understanding, the part of the technical solution of the present disclosure that is essential or contributes to the prior art, or a part of the technical solution may be embodied in the form of a software product. The computer software product is stored in a storage medium, which includes several instructions to enable a computer device (which may be a personal computer, an electronic device, or a network device) to execute all or some steps of the methods set forth in the embodiments of the present disclosure.

It should be noted that the terms of "including", "comprising" or any other variants thereof herein intend to encompass a non-exclusive inclusion, such that a process, method, object or device comprising a series of elements not only comprises these elements, but also comprises other elements that are not specifically listed, or further comprises elements that are inherent to the process, method, object or device. When there is no further restriction, elements defined by the statement "comprising one . . . " does not exclude that a process, method, object or device comprising the above elements further comprises other identical elements.

Only preferred embodiments of the present disclosure are described above, which are not used to limit the present disclosure. To a person skilled in the art, the present disclosure may have a variety of modifications and variations. Any modification, equivalent substitution, and improvement made within the spirit and principle of the present disclosure shall be encompassed by the present disclosure. It should be noted that similar numbers and letters in the following drawings represent similar items. Therefore, once an item is defined in one figure, there is no need to further define or explain the item in subsequent figures.

Only specific implementation manners of the present disclosure are described above. However, the scope of the present disclosure is not limited thereto. Variations or substitutions that could be easily conceived of by a person skilled in the art within the technical scope disclosed by the present disclosure shall all be encompassed by the present disclosure. Therefore, the scope of the present disclosure shall be subject to the scope of the claims. To a person skilled in the art, the present disclosure is apparently not limited to the details of the above exemplary embodiments. Without departing from the spirit or basic features of the present disclosure, moreover, the present disclosure may be implemented in other specific forms. From any point of view, therefore, the embodiments shall be deemed as exemplary and not restrictive. The scope of the present disclosure is defined by the appended claims, instead of the above description. Therefore, it is intended that all variations falling in the meaning and scope of the equivalent elements of the claims are encompassed by the present disclosure. No legends in the accompanying drawings shall be construed as a limitation to the involved claims.

What is claimed is:

1. An information publishing method applied to an information publishing terminal and a server in communication with an information receiving terminal, wherein the server comprises a database storing a correspondence between the information publishing terminal and an information receiving terminal, comprising:
    receiving, by the server, published information from the information publishing terminal;
    acquiring, by the server, according to the information publishing terminal, an online status of the information receiving terminal, the online status being based on whether the information receiving terminal is opened at a front end of a user terminal that runs the information receiving terminal; and
    sending, by the server, the published information to the information receiving terminal according to the online status of the information receiving terminal, comprising:
    in response to the online status of the information receiving terminal being offline, pushing, by the server, the published information to the front end of the user terminal; and
    in response to the online status of the information receiving terminal becoming online, receiving, by the information receiving terminal, the published information at the front end of the user terminal.

2. The information publishing method according to claim 1, wherein receiving the published information from the information publishing terminal and acquiring the online status of the information receiving terminal comprises:
    after receiving the published information, sending, by the server an online detection request to the information receiving terminal corresponding to the information publishing terminal; and
    acquiring, by the server, according to feedback information from the information receiving terminal on basis of the online detection request, the online status of the information receiving terminal.

3. The information publishing method according to claim 1, wherein acquiring the online status of the information receiving terminal from the database comprises:
    sending, by the server an online detection request to the information receiving terminal at a preset time interval;
    acquiring, by the server, according to feedback information of the online detection request, an online status of the information receiving terminal; and
    storing the online status of the information receiving terminal in the database.

4. The information publishing method according to claim 1, wherein sending the published information to the information receiving terminal further comprises:
    when the online status of the information receiving terminal is online, inserting the published information into an information stream publishing queue of the information receiving terminal.

5. The information publishing method according to claim 1, further comprising:
    establishing the correspondence between the information publishing terminal and the information receiving terminal.

6. The information publishing method according to claim 5, wherein establishing the correspondence between the information publishing terminal and the information receiving terminal comprises:
    establishing, by the server, according to an operation received by the information receiving terminal for establishing the correspondence with the information publishing terminal, the correspondence between the information receiving terminal and the information publishing terminal; and
    storing the correspondence, wherein the operation includes a following operation or a subscription operation.

7. An information publishing device applied to an information publishing terminal and a server in communication with an information receiving terminal, wherein the server comprises a database storing a correspondence between the information publishing terminal and the information receiving terminal, comprising:
    a receiving and acquiring module configured to receive published information from the information publishing terminal and acquire, according to the information publishing terminal, an online status of a corresponding information receiving terminal, the online status being based on whether the information receiving terminal is opened at a front end of a user terminal that runs the information receiving terminal; and
    an information sending module configured to send the published information to the information receiving terminal according to the online status of the information receiving terminal, the sending the published information comprising:

in response to the online status of the information receiving terminal being offline, pushing the published information to the front end of the user terminal.

8. The information publishing device according to claim 7, wherein receiving the published information from the information publishing terminal and acquiring the online status of the information receiving terminal comprises:
after receiving the published information, sending an online detection request to an information receiving terminal corresponding to the information publishing terminal; and
acquiring, according to feedback information of the online detection request, an online status of the information receiving terminal.

9. The information publishing device according to claim 7, wherein acquiring the online status of the information receiving terminal from the database comprises:
sending an online detection request to the information receiving terminal at a preset time interval;
acquiring, according to feedback information from the information receiving terminal on the basis of the online detection request, an online status of the information receiving terminal; and storing the online status of the information receiving terminal in the database.

10. The information publishing device according to claim 7, wherein sending the published information to the information receiving terminal comprises:
when the online status of the information receiving terminal is online, inserting the published information into an information stream publishing queue of the information receiving terminal.

11. The information publishing device according to claim 7, further comprising:
a relationship establishing module configured to establish the correspondence between the information publishing terminal and the information receiving terminal.

12. The information publishing device according to claim 11, wherein establishing the correspondence between the information publishing terminal and the information receiving terminal comprises:
establishing, according to an operation received by the information receiving terminal for establishing the correspondence with the information publishing terminal, the correspondence between the information receiving terminal and the information publishing terminal; and
storing the correspondence, wherein the operation includes a following operation or a subscription operation.

13. A server, comprising:
a memory, comprising a database storing a correspondence between an information publishing terminal and an information receiving terminal;
a processor, wherein the memory further stores instructions that, when executed by the processor, cause the processor to perform:
receiving published information from the information publishing terminal and acquiring, according to the information publishing terminal, an online status of the information receiving terminal, the online status being based on whether the information receiving terminal is opened at a front end of a user terminal that runs the information receiving terminal; and
sending the published information to the information receiving terminal according to the online status of the information receiving terminal, comprising:
in response to the online status of the information receiving terminal being offline, pushing the published information to the front end of the user terminal.

14. The server according to claim 13, wherein to send the published information to the information receiving terminal, the instructions further cause the processor to:
when the online status of the information receiving terminal is online, insert the published information into an information stream publishing queue of the information receiving terminal.

15. The server according to claim 13, wherein to receive the published information from the information publishing terminal and acquire the online status of the information receiving terminal, the instructions further cause the processor to:
after receiving the published information, send an online detection request to the information receiving terminal corresponding to the information publishing terminal; and
acquire, according to feedback information from the information receiving terminal on basis of the online detection request, the online status of the information receiving terminal.

16. The server according to claim 13, wherein to acquire the online status of the information receiving terminal from the database, the instructions further cause the processor to:
send an online detection request to the information receiving terminal at a preset time interval;
acquire, according to feedback information of the online detection request, an online status of the information receiving terminal; and
store the online status of the information receiving terminal in the database.

17. The server according to claim 13, wherein the instructions further cause the processor to:
establish, according to an operation received by the information receiving terminal for establishing the correspondence with the information publishing terminal, the correspondence between the information receiving terminal and the information publishing terminal; and
store the correspondence, wherein the operation includes a following operation or a subscription operation.

18. The information publishing method according to claim 3, wherein the preset time interval is determined based on a frequency at which published information is updated at the information receiving terminal or the information publishing terminal.

19. The information publishing method of claim 3, wherein the preset time interval is inversely correlated to a frequency at which published information is updated at the information receiving terminal or the information publishing terminal.

20. The information publishing method of claim 1, wherein the acquiring the online status of the information receiving terminal comprises determining that the information receiving terminal is offline in response to the information receiving terminal running at a back end of the user terminal.

* * * * *

UNITED STATES PATENT AND TRADEMARK OFFICE
CERTIFICATE OF CORRECTION

PATENT NO. : 10,594,776 B2
APPLICATION NO. : 15/855878
DATED : March 17, 2020
INVENTOR(S) : Lingyun Yi Page 1 of 1

It is certified that error appears in the above-identified patent and that said Letters Patent is hereby corrected as shown below:

In the Claims

In Claim 3, Column 10, Line 19:
"sending, by the server an online" should read --sending, by the server, an online--.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*